US012504293B2

(12) United States Patent
Wu et al.

(10) Patent No.: US 12,504,293 B2
(45) Date of Patent: Dec. 23, 2025

(54) ELECTRIC VEHICLE CHARGING RECOMMENDATION SYSTEMS AND METHODS

(71) Applicant: Ford Global Technologies, LLC, Dearborn, MI (US)

(72) Inventors: Kai Wu, Pittsburgh, PA (US); Dominique Meroux, Ann Arbor, MI (US); Yan Fu, Bloomfield Hills, MI (US); Chen Zhang, South Lyon, MI (US); Hyongju Park, Ann Arbor, MI (US); Venkatarao Rebba, Dearborn, MI (US)

( * ) Notice: Subject to any disclaimer, the term of this patent is extended or adjusted under 35 U.S.C. 154(b) by 97 days.

(21) Appl. No.: 18/429,705

(22) Filed: Feb. 1, 2024

(65) Prior Publication Data

US 2025/0251252 A1   Aug. 7, 2025

(51) Int. Cl.
*G01C 21/36* (2006.01)
*B60L 53/66* (2019.01)
(Continued)

(52) U.S. Cl.
CPC ........ *G01C 21/3617* (2013.01); *B60L 53/665* (2019.02); *B60L 58/13* (2019.02);
(Continued)

(58) Field of Classification Search
CPC ............ G01C 21/3617; G01C 21/3492; B60L 53/665; B60L 2250/16
See application file for complete search history.

(56) References Cited

U.S. PATENT DOCUMENTS

| 8,860,362 B2 | 10/2014 | Kamen et al. |
| 10,737,585 B2 | 8/2020 | Chaudhary et al. |

(Continued)

FOREIGN PATENT DOCUMENTS

| CN | 116166880 A | * | 5/2023 | ......... G06F 16/9535 |
| KR | 20230139084 A | * | 10/2023 | ............. G06Q 50/30 |

OTHER PUBLICATIONS

Prince Waqas Khan, et.al., Blockchain-Based Peer-To-Peer Energy Trading and Charging Payment System for Electric Vehicles, MDPI, https://www.mdpi.com/2071-1050/13/14/7962, Jul. 16, 2021, pp. 1-16.

*Primary Examiner* — Helal A Algahaim
(74) *Attorney, Agent, or Firm* — Emily Drake; Eversheds Sutherland (US) LLP

(57) ABSTRACT

An electric vehicle charging recommendation system is disclosed. The system comprises a transceiver and a processor. The transceiver is configured to receive a request from a user interface associated with a vehicle user. The request includes one or more of vehicle route information and vehicle State of Charge (SoC) level. The processor is configured to generate a geofence, and obtain real-time operator charging amounts from charging station operators located in the geofence. The processor is further configured to determine that a charging demand in the geofence is less than a predetermined threshold value, and activate a first mode when the charging demand is less than the predetermined threshold value. The processor is further configured to generate a first list of recommended charging stations based on the real-time operator charging amounts responsive to the activation of the first mode, and transmit the first list to the user interface.

14 Claims, 5 Drawing Sheets

(51) Int. Cl.
*B60L 58/13* (2019.01)
*G01C 21/34* (2006.01)

(52) U.S. Cl.
CPC ..... *G01C 21/3492* (2013.01); *G01C 21/3682* (2013.01); *G01C 21/3694* (2013.01); *B60L 2240/60* (2013.01); *B60L 2250/16* (2013.01)

(56) References Cited

U.S. PATENT DOCUMENTS

| | | |
|---|---|---|
| 2012/0296794 A1 | 11/2012 | Boot et al. |
| 2020/0143460 A1 | 5/2020 | Hong et al. |
| 2022/0122164 A1 | 4/2022 | Kudo et al. |
| 2025/0065765 A1* | 2/2025 | Gaither et al. .......... H04W 4/44 |

* cited by examiner

ELECTRIC VEHICLE CHARGING RECOMMENDATION SYSTEMS AND METHODS

FIELD

The present disclosure relates to electric vehicles and more particularly to electric vehicle charging recommendation systems and methods.

BACKGROUND

With increasing number of electric vehicles (EVs), the EV landscape is rapidly evolving. The EV operates on electric energy, and a vehicle user is required charge the vehicle battery regularly to ensure uninterrupted vehicle operation. The vehicle user may charge the EV at the user's home or at public charging stations. Various public charging stations use a fixed charging model to charge the EV, which may not be beneficial for all the stakeholders.

There exists a need for a resource management system and method that optimally utilizes the EV charging station network.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
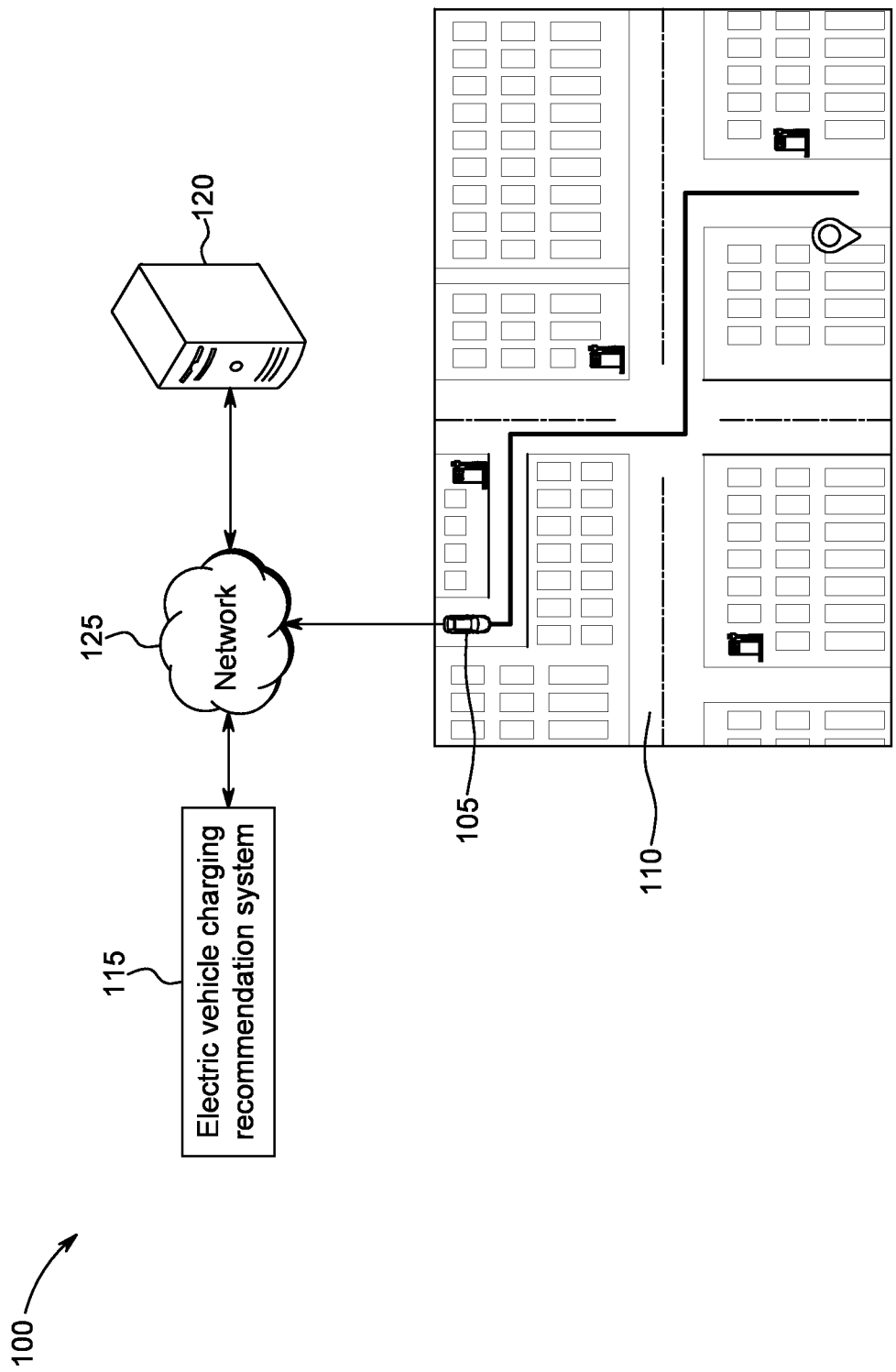
FIG. 1 depicts an example environment in which techniques and structures for providing the systems and methods disclosed herein may be implemented.

The present disclosure describes an electric vehicle charging recommendation system that provides charging recommendations to a vehicle user associated with a vehicle. Specifically, the system may provide a recommendation for a charging station, from a plurality of charging stations, at which the vehicle user may charge the vehicle.

In some aspects, the system may be configured to generate a list of recommended charging stations, in which the charging stations may be ranked or sorted in a specific order. The system may generate the list based on various parameters. For example, the system may obtain real-time charger operator amounts from a plurality of charging station operators associated with the plurality of charging stations located in a local geofence (e.g., a local geographical area in a road network where the vehicle may be expected to require/need charging), and generate/sort the list of charging stations based on the real-time charger operator amounts. The top predefined count of charging stations in the sorted list may be the list of recommended charging stations. In an exemplary aspect, the system may include only those charging stations in the list which are offering charging at a charging amount less than a user-preferred charging amount (e.g., a maximum amount at which the vehicle user may desire to purchase the electric energy to charge the vehicle via a charging station, and associated charging energy required). In further aspects, the system may generate the list based on assessment of the plurality of charging stations, clean energy ratings, user preferences, and/or the like.

In some aspects, the system may be configured to generate the list of recommended charging stations based on a demand of charging in the local geofence. For example, when the demand of charging may be greater than a predetermined threshold, the system may allow the vehicle user to input one or more user charging amounts (such as a first user charging amount, a second user charging amount, and associated charging energy required) in real-time to bid against the real-time operator charging amounts. In some aspects, the system may obtain the first user charging amount, and "pair" the first user charging amount with the real-time operator charging amounts. Stated another way, the system may identify charging station(s) for the vehicle user, which may be offering charging at a charging amount less than or equal to the first charging amount.

When the system identifies the charging station(s), the system may transmit information associated with the identified charging station(s) to a user interface (e.g., a vehicle Human-Machine Interface (HMI) or a user device associated with the vehicle user). The vehicle user may view the list having the charging station(s) and provide confirmation or select the charging station at which the vehicle user desires to charge the vehicle. The system may then initiate or enable a transaction between the vehicle user and the charging station.

In a scenario in which the system does not identify a pair for the first user charging, the system may obtain a second user charging amount from the vehicle user (via the user interface), in a subsequent operational cycle associated with the system. Responsive to obtaining the second user charging amount, the system may identify the pair for the second user charging amount, in the same manner as the first user charging amount. In some aspects, the second user charging amount may be greater than the first user charging amount.

The present disclosure discloses an electric vehicle charging recommendation system that provides charging recommendations to a vehicle user. The system facilitates the charging station operator to provide incentives and attract more customers, and empower charging station operators to present an optimized charging amount to attract more customers. In addition, the system may prioritize user preferences, thereby enhancing user/customer experience.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 105 that may be a battery electric vehicle (BEV) or a plug-in hybrid electric vehicle (PHEV). The vehicle 105 may take the form of any passenger or commercial vehicle such as, for example, an off-road vehicle, a car, a crossover vehicle, a van, a minivan, a bus, a truck, etc. Further, the vehicle 105 may be a manually driven vehicle and/or may be configured to operate in partially or fully autonomous mode. The vehicle 105 may include a traction battery or battery pack ("vehicle battery", not shown) that may provide energy for vehicle propulsion. The vehicle battery may be charged by an external power source, for example an electric vehicle (EV) charger. The vehicle 105 may be travelling on a road network 110 that may be located in a city, a rural area, a suburb, etc.

The environment 100 may further include an electric vehicle charging recommendation system 115 (or system 115) and one or more server(s) 120. The system 115, the server(s) 120, and the vehicle 105 may communicatively couple with each other via one or more networks 125. The network(s) 125 illustrates an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Bluetooth Low Energy (BLE), Wi-Fi based on the Institute of Electrical and Electronics Engineers (IEEE) standard 802.11, Ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the server(s) 120 may be part of a cloud-based computing infrastructure and may be associated with and/or include a Telematics Service Delivery Network (SDN) that provides digital data services to the vehicle 105 and other vehicles (not shown in FIG. 1) that may be part of a vehicle fleet. In some aspects, a vehicle fleet operator(s) (not shown), a vehicle user, and/or charging station operator(s) may operate the server(s) 120. In additional aspects, the server(s) 120 may be configured to store and provide charging station information to the system 115. The charging station information may include, for example, charging station location on the road network 110, historical charging station assessment rating, clean energy rating, user feedbacks associated with one or more charging stations on the road network 110, charging station working status, and/or the like.

The system 115 may be configured to provide charging recommendations to a vehicle user associated with the vehicle 105. Specifically, the system 115 may be configured to obtain one or more inputs from the vehicle 105 (or a user device/interface associated with the vehicle user), user device/interface associated with charging station operators, and/or the server(s) 120, and may provide charging recommendations to the vehicle user based on the obtained inputs. For example, the system 115 may recommend one or more optimal charging stations to charge the vehicle 105 based on the inputs. The details of the recommendation may be understood as follows.

In some aspects, the system 115 may obtain a request from the vehicle 105 or the user device associated with the vehicle user to provide a recommendation of a charging station to charge the vehicle 105. In some aspects, the request may include, for example, a vehicle route information (e.g., a vehicle current/source location and a vehicle destination location), a vehicle current State of Charge (SOC) level, user preferences, and/or the like. The user preferences may include a preferred charging speed, charging station reliability (including ease of accessing the charging station, working status, etc.), charging station location, charging station assessment rating, services/amenities offered in proximity to the charging station, SOC endpoint, and/or the like. Alternatively, when the system 115 receives the request, the system 115 may fetch the vehicle route information, the vehicle current SOC level, the user preferences, etc. from the one or more of the vehicle 105, the user device, the server 120, and/or the like.

Responsive to obtaining the request, the system 115 may compute or generate a local geofence. In some aspects, the system 115 may compute/generate the local geofence based on the vehicle route information. In further aspects, the system 115 may compute/generate the local geofence based on the current vehicle SOC level. The local geofence may be a local geographical area in or around the road network 110 where the vehicle 105 may be expected to require/need charging based on the vehicle route information and/or the current vehicle SOC level.

Responsive to computing/generating the local geofence, the system 115 may determine a charging demand in the local geofence in real-time. For example, the system 115 may determine if a count of requests associated with one or more charging stations (e.g., for charging vehicles at the charging stations) located in the local geofence may be less than a predetermined threshold value. In further aspects, the system 115 may determine the charging demand based on the SOC endpoint and real-time traffic details. The system 115 may identify and designate charging energy consumption blocks based on such determination. Responsive to a determination that the demand may be less than the predetermined threshold value, the system 115 may begin to operate in a first mode (or first system operational mode) or activate a first mode of system operation (e.g., a single bidding mode or single EV single-round bidding system). Alternatively, responsive to a determination that the demand may be greater than the predetermined threshold value, the system 115 may begin to operate in a second mode or activate a second mode (or second system operational mode) of system operation (e.g., a double bidding mode or continuous double bidding system).

In the first mode of system operation, the system 115 may be configured to obtain real-time operator charging amounts (or a per-unit asking/selling price of electric charge to be used to charge EVs) from a plurality of charging station operators/owners. The plurality of charging station operators/owners may be associated with a plurality of charging stations that may be located in the local geofence. In some aspects, the real-time operator charging amount may be an asking price that the respective charging station operators may be charging for EV charging. A person ordinarily skilled in the art may appreciate from the description above that in the first mode of system operation, the system 115 aggregates real-time asking price for EV charging associated with the charging stations that may be located in the local geofence. In other aspects, the system 115 may obtain the operator charging amounts offline.

Responsive to aggregating the real-time operator charging amounts, the system 115 may generate a first list of recommended charging stations from the plurality of charging stations located in the local geofence for the vehicle 105. In some aspects, the system 115 may generate the first list of recommended charging stations based on the aggregated real-time operator charging amounts associated with the charging stations located in the local geofence. As an example, the system 115 may rank and sort the charging stations based on their respective real-time operator charging amounts in ascending order, and generate a list of top 10 charging stations as the first list of recommended charging stations.

In further aspects, the system 115 may be configured to obtain, from a vehicle Human-Machine Interface (HMI) of the vehicle 105 or the user device associated with the vehicle user, a user charging amount (e.g., a maximum charging amount/buy price) at which the vehicle user may desire to purchase the electric energy to charge the vehicle 105 via a charging station. The system 115 may generate the first list of recommended charging stations based on the user charging amount. For example, the system 115 may provide the recommendation of charging stations for which the real-time operator charging amounts are less than the user charging amount. In the first mode, the system 115 may be configured to obtain the user charging amount only once.

In further aspects, the system 115 may generate the first list of recommended charging stations based on the charging station information stored on the server 120 (e.g., historical charging station assessment rating, clean energy rating, user feedbacks, charging station location, etc.) and/or the user preferences described above. As an example, the system 115 may provide a higher ranking for the charging station offering specific services/amenities (e.g., food or parking facility), even if the charging amount associated with the charging station may be higher than other charging stations.

Responsive to generating the first list of recommended charging stations, the system 115 may transmit the first list of recommended charging stations to a user interface (e.g., the vehicle HMI, the user device, etc.). In some aspects, the system 115 may cause the vehicle 105 (or the user device) to display the first list of recommended stations on the respective user interface. The vehicle user may view the first list of recommended charging stations on the user interface and may select a charging station from the first list to charge the vehicle 105. The system 115 may receive the input/selection of the charging station from the vehicle user and may direct/redirect the vehicle 105 to the selected charging station. In some aspects, the system 115 may facilitate the vehicle 105 to autonomously navigate towards the selected charging station. In other aspects, the system 115 may generate and transmit navigation instructions that may facilitate the vehicle user to drive to the selected charging station. In addition, the system 115 may enable a transaction between the user interface and the selected charging station.

In the second mode of system operation, the system 115 may obtain the real-time operator charging amounts from the plurality of charging station operators/owners associated with the plurality of charging stations located in the local geofence. In addition to obtaining the real-time operator charging amounts described above, in the second mode of system operation, the system 115 may obtain one or more user charging amounts from the user interface (e.g., the vehicle HMI, the user device, etc.) associated with the vehicle user. A user charging amount may be a charging buy price (e.g., a bid price) at which the vehicle user may desire to purchase the electric energy to charge the vehicle 105 via a charging station. In some aspects, the system 115 may obtain one or more user charging amounts in different/subsequent cycles of the second mode. For example, in some aspects, the system 115 may obtain a first user charging amount (of one or more charging amounts) in a "first cycle" (or a first bid cycle) of the second mode. Responsive to obtaining the first user charging amount, the system 115 may identify charging stations in the local geofence that may be offering charging at a charging amount less than the first user charging amount. Specifically, the system 115 may compare the real-time operator charging amounts with the first user charging amount, and identify one or more first charging stations (from the plurality of charging stations) that may be offering charging at a charging amount less than the first user charging amount, based on the comparison.

Responsive to identifying such charging stations, the system 115 may generate a second list of recommended charging stations. The second list of recommended charging stations may include the one or more first charging stations (e.g., identified charging stations) that may be offering charging amount that may be less than or equal to the first user charging amount (i.e., the real-time operator charging amount is less than or equal to the first user charging amount). The system 115 may be further configured to transmit the second list of recommended charging stations to the user interface (in the same manner as the system 115 transmits the first list of recommended charging stations, as described above), and enable a transaction between the user interface and the selected charging station. In addition, the system 115 may generate the second list of recommended charging stations based on the charging station information stored on the server 120 and/or the user preferences, as described above.

On the other hand, when the system 115 may not identify any charging station that may be offering a charging amount that may be less than or equal to the first user charging amount, the system 115 may obtain a second user charging amount (of one or more charging amounts) from the user interface (from the same vehicle user) in a "second cycle" (or a second bid cycle) of the second mode. In some aspects, the second user charging amount may be greater than the first user charging amount. Alternatively, the second user charging amount may be same as the first user charging amount (in case the vehicle user does not desire to increase the first user charging amount).

Responsive to obtaining the second user charging amount, the system 115 may identify charging stations in the local geofence that may be offering charging at a charging amount less than the second user charging amount. Specifically, the system 115 may compare the real-time operator charging amounts with the second user charging amount, and identify one or more second charging stations (from the plurality of charging stations) that may be offering charging at a charging amount less than the second user charging amount based on the comparison. Responsive to identifying such charging stations, the system 115 may generate a third list of recommended charging stations, and transmit the third list of recommended charging stations to the user interface. The third list of recommended charging stations may include the one or more second charging stations that may be offering charging amount that may be less than the second user charging amount (i.e., the real-time operator charging amount may be less than the second user charging amount). In this manner, in the second mode of system operation, the vehicle user may gradually increase the amount that the vehicle user may be willing to pay for the electric energy, till the system 115 determines at least one charging station that may match the user's offered amount.

Detailed process of determining and providing charging recommendations to the vehicle 105 is described below in conjunction with FIG. 2.

The vehicle 105 and the system 115 implement and/or perform operations, as described here in the present disclosure, in accordance with the owner manual and safety guidelines. In addition, any action taken by the vehicle user should comply with all the rules specific to the location and operation of the vehicle 105 (e.g., Federal, state, country, city, etc.). The notifications, recommendations, as provided by the vehicle 105 or the system 115, should be treated as suggestions and only followed according to any rules specific to the location and operation of the vehicle 104.

Figure 2:
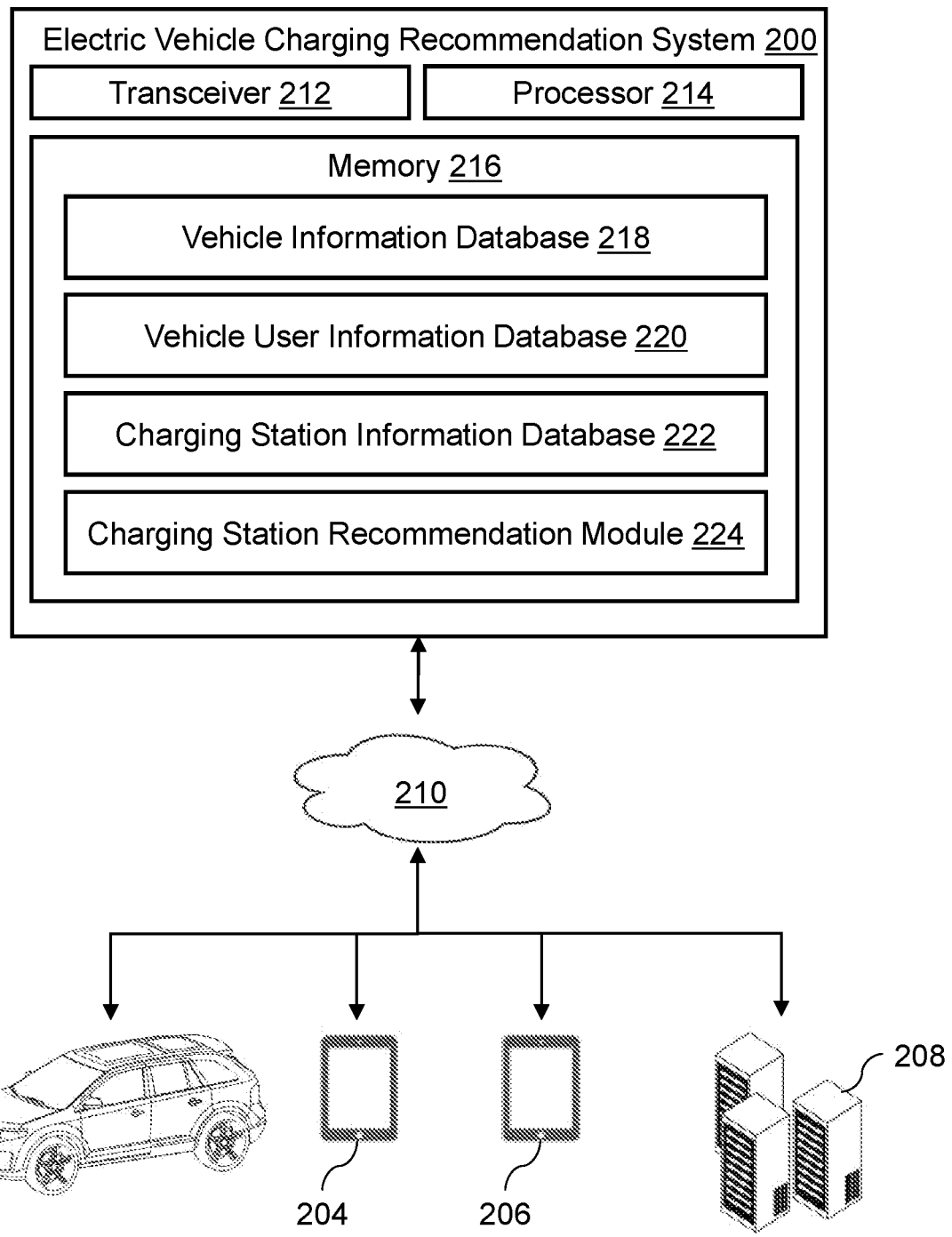
FIG. 2 depicts a block diagram of an example electric vehicle (EV) charging recommendation system in accordance with the present disclosure.

FIG. 2 depicts a block diagram of an example electric vehicle (EV) charging recommendation system 200 (system 200) in accordance with the present disclosure. While describing FIG. 2, references may be made to FIGS. 3 and 4.

The system 200 may be same as the system 115. The system 200, as described herein, can be implemented in hardware, software (e.g., firmware), or a combination thereof. The system 200 may be communicatively connected with a vehicle 202, a vehicle user device 204 (e.g., a first user device 204), a charging station operator user device 206 (e.g., a second user device 206), and one or more server(s) 208 via a network 210. In some aspects, the system 200 may be a part of the vehicle 202. In other aspects, the system 200 may be a part of the server(s) 208. In yet another aspect, the system 200 may be part of an external server (not shown) that may not be part of the server(s) 208.

The vehicle 202 may be same as the vehicle 105, the server(s) 208 may be same as the server(s) 120, and the network 210 may be same as the network 125. The first user device 204 may be associated with a vehicle driver/user (not shown) of the vehicle 202. Each of the first and second user devices 204, 206 may be, for example, a mobile phone, a laptop, a computer, a tablet, a wearable device, or any other similar device with communication capabilities.

The system 200 may include a plurality of units including, but not limited to, a transceiver 212, a processor 214, and a memory 216. The transceiver 212 may be configured to transmit and receive information to and from the vehicle 202, the first user device 204, the second user device 206, and the server(s) 208, via the network 210.

The processor 214 may be disposed in communication with one or more memory devices, e.g., the memory 216 and/or one or more external databases (not shown in FIG. 2). The processor 214 may utilize the memory 216 to store programs in code and/or to store data for performing various system operations in accordance with the present disclosure. The memory 216 may be a non-transitory computer-readable medium or memory storing an EV charging recommendation program code. The memory 216 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 216 may include a plurality of modules and databases including, but not limited to, a vehicle information database 218, a vehicle user information database 220, a charging station information database 222, and a charging station recommendation module 224. The charging station recommendation module 224, as described herein, may be stored in the form of computer-executable instructions, and the processor 214 may be configured and/or programmed to execute the stored computer-executable instructions for performing system functions in accordance with the present disclosure.

The vehicle information database 218 may store information associated with a plurality of vehicles operating as part of a vehicle fleet, and/or a plurality of passenger vehicles. For example, the vehicle information database 218 may store the vehicle information associated with the vehicle 202. The vehicle information may include vehicle route information and vehicle SOC level, as described above in conjunction with FIG. 1. In particular, the transceiver 212 may receive/obtain the vehicle information from the vehicle 202 at a predefined frequency (e.g., every minute or every 5-10 minutes), and send the vehicle information to the vehicle information database 218 for storage purpose. In some aspects, the vehicle route information may include current vehicle route information and upcoming vehicle route information (e.g., destination locations for future trips).

The vehicle user information database 220 may store the driver information associated with the drivers (i.e., the vehicle users) that may drive the plurality of vehicles operating as part of vehicle fleet, and/or the plurality of passenger vehicles. For example, the vehicle user information database 220 may store the user information associated with the vehicle user the vehicle 202. In some aspects, the user information may include the user preferences, one or more user charging amounts (including the first user charging amount, the second user charging amount), as described above in conjunction with FIG. 1. The transceiver 212 may receive/obtain the user information from the first user device 204, the vehicle 202, and/or the server(s) 208 at the predefined frequency or when the vehicle user provides such information. The transceiver 212 may send the received user information to the vehicle user information database 220 for storage purpose.

The charging station information database 222 may store the charging station information described above in conjunction with FIG. 1. The transceiver 212 may receive/obtain the charging station information from the second user device 206 and/or the server(s) 208 at a predefined frequency (e.g., every 5 minutes or 10 minutes) or when the charging station operator provides such information. In some aspects, the charging station information may include, for example, charging station location on the road network 110, historical charging station assessment rating, clean energy rating, user feedbacks associated with one or more charging stations on the road network 110, charging station working status, and/or the like. The transceiver 212 may send the received charging station information to the charging station information database 222 for storage purpose. In some aspects, the charging station information database 222 may further include/store the real-time operator charging amounts obtained from the plurality of charging stations. In some aspects, the charging station information database 222 may further store information associated with incentives or additional services that may be offered by the respective charging station operators.

In operation, the transceiver 212 may receive a request from the vehicle 202 (e.g., via the vehicle HMI) or the first user device 204 to provide recommendation of a charging station to charge the vehicle 202. The processor 214 may obtain the request from the transceiver 212. In some aspects, the processor 214 may obtain the request when the vehicle user desires to view recommendation of charging stations. In an exemplary aspect, the request may include vehicle information including, but not limited to, the vehicle route information and the vehicle SOC level. In addition, the request may include the user preferences. As described above, the transceiver 212 may send the received information to the respective vehicle information database 218 and the vehicle user information database 220 for storage purpose.

The processor 214 may obtain the request (along with the vehicle information and the user preferences) from the transceiver 212. Alternatively, the processor 214 may obtain the vehicle information and the user preferences from the respective vehicle information database 218 and the vehicle user information database 220, responsive to obtaining the request from the transceiver 212.

Figure 3:
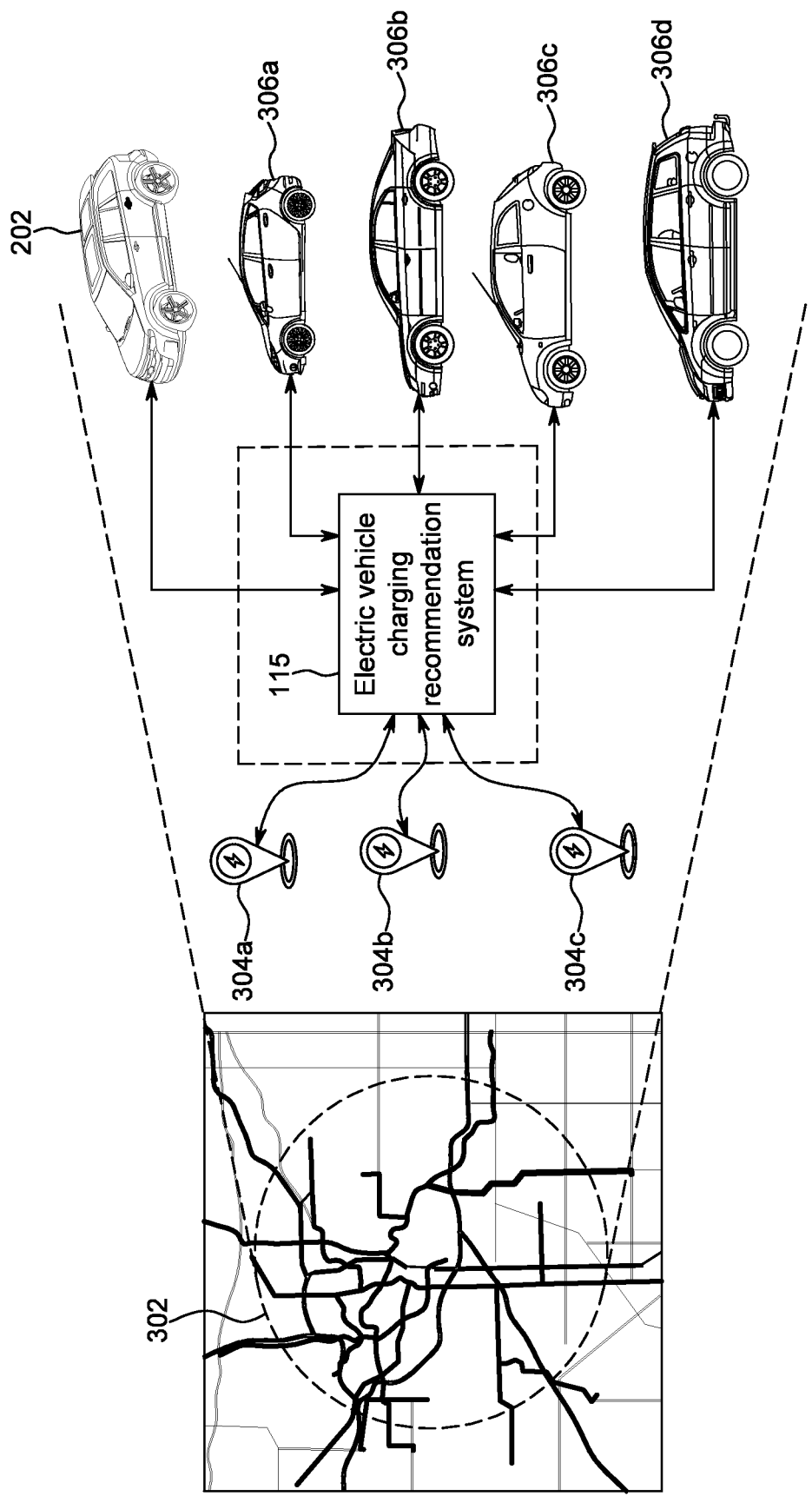
FIG. 3 depicts an example recommendation process in accordance with the present disclosure.

The processor 214 may then compute or generate a local geofence 302 (as shown in FIG. 3) based on the obtained vehicle information. The local geofence 302 may be a local geographical area/zone (e.g., in the road network 110) where the vehicle 202 may be expected to require/need charging. In some aspects, the processor 214 may compute/generate the local geofence 302 based on the vehicle route information and/or the current vehicle SOC level. As an example, when the current vehicle SOC level may be 10% of a maximum SOC level, the processor 214 may generate the local geofence 302 in proximity to a vehicle's current location. Alternatively, when the current vehicle SOC level may be more than 30% of the maximum SOC level, the processor 214 may generate the local geofence 302 slightly farther away from the vehicle's current location. The location of the local geofence 302 may also be based on a typical SOC level at which the vehicle user prefers to charge the vehicle 202 (determined based on historical vehicle charging trend/pattern or the user preferences). In some aspects, the size/area of the local geofence 302 may be static. In other aspects, the size/area of the local geofence 302 may be dynamic and may change based on the local demand of electric energy in the local geofence 302.

Responsive to generating the local geofence 302, the processor 214 may determine a charging demand in the local geofence 302. For example, the processor 214 may determine if the count of requests for electric energy (from the vehicle 202 and additional vehicles 306a-d, as shown in FIG. 3) associated with the charging stations located in the local geofence 302 may be less than or greater than a predetermined threshold value. Responsive to a determination that the demand may be less than the predetermined threshold value, the processor 214 may activate the first mode (e.g., the single bidding mode) of system operation, as described above in conjunction with FIG. 1. Alternatively, responsive to a determination that the demand may be greater than the predetermined threshold value, the processor 214 may activate the second mode (e.g., the double bidding mode) of system operation.

In the first mode of system operation, the processor 214 may obtain the real-time operator charging amounts from the second user device(s) 206 associated with the charging station operators associated with the charging stations 304a, 304b, 304c (collectively referred to as charging stations 304), shown in FIG. 3. The charging stations 304 may be located in the local geofence 302. Stated another way, the processor 214 may aggregate the asking/selling price associated with the charging stations 304 located in the local geofence 302, when the system 200 may be operating in the first mode. In some aspect, in the first mode of system operation, the processor 214 may first identify the charging stations 304 that may be located in the local geofence 302 based on the charging station information stored in the charging station information database 222, and then obtain the real-time operator charging amounts for the charging stations 304 from respective second user device(s) 206.

Responsive to obtaining the real-time operator charging amounts associated with the charging stations 304, the processor 214 may generate the first list of recommended charging stations (e.g., a list sorted based on one or more parameters, e.g., asking price of electric energy in each charging station, user feedback rating for each charging station, distance of each charging station from vehicle's current geolocation, and/or the like). In some aspects, the processor 214 may generate the first list based on the aggregated real-time operator charging amounts. In further aspects, the processor 214 may be configured to obtain, from the vehicle HMI or the user device associated with the vehicle user, a user charging amount (e.g., a maximum charging amount/buy price) at which the vehicle user may desire to purchase the electric energy to charge the vehicle 202 via a charging station. The processor 214 may generate the first list of recommended charging stations based on the user charging amount. For example, the processor 214 may provide the recommendation of charging stations for which the real-time operator charging amounts may be less than the user charging amount. In the first mode, the processor 214 may obtain the user charging amount only once.

In further aspects, the processor 214 may generate the first list based on the charging station information stored on the server 208 (e.g., historical charging station assessment ratings, clean energy rating, historical user feedbacks, charging station locations, etc.). In an exemplary aspect, the processor 214 may obtain information associated with a charging station location (from other users and/or the server 208) and may determine whether the charging station is located in an unsecure zone, and may generate the first list based on the determination. In this case, the charging station located in the unsecure zone may not be included in the first list. In further aspects, the processor 214 may aggregate information associated with other amenities/services in the local geofence 302 (via the server 208, the user device 206, or any other device), and may generate the first list based on the aggregated information. For example, the processor 214 may evaluate the facilities such as restaurants, parking etc. in proximity to the charging station location, and may rank the charging stations in the first list based on the evaluation.

In some aspects, the processor 214 may evaluate the remaining backup battery storage to buffer (and/or on-site renewable power generation information) of different charging stations, and determine an amount of electricity that needs to be drawn by the charging stations from the grid and/or an amount of renewable power generation (or any other storage buffer) that may be curtailed due to insufficient demand. In some aspects, a given charging station may be grid-tied with some storage buffer, or a part of a larger micro-grid or virtual power plant (VPP), which may or may not be connected with the grid. Based on the determination, the processor 214 may assign clean energy rating to the charging stations and may generate/sort the first list based on the clean energy rating. In some aspects, the processor 214 may obtain the clean energy rating as a part of the charging station information (e.g., from the server 208), and may generate/sort the first list based on the clean energy rating.

In further aspects, the processor 214 may generate the first list based on the user preferences. For example, when the processor 214 determines that the user prefers a fast charging station at which the user may charge the vehicle 202 in less time (and may purchase the electric energy at a higher amount), the processor 214 may provide a higher rank to (or select) the charging stations in which the charging speed may be high and/or the waiting time may be less.

Responsive to generating the first list, the processor 214 may transmit the first list to the vehicle HMI or the first user device 204. In some aspects, the processor 214 may cause the vehicle 202 (or the first user device 204) to display the first list on the respective user interface. The vehicle user may view the first list on the user interface and may select a charging station from the first list. The processor 214 may obtain the inputs/selection from the first user device 204 and may direct/redirect the vehicle 202 to the selected charging station to enable the vehicle user to conveniently charge the vehicle 202. In further aspects, the processor 214 may initiate/enable transaction between the vehicle 202 (or the user interface) and the selected charging station responsive to obtaining the inputs. In addition, the processor 214 may obtain user feedback to enhance user experience in the future.

In some scenarios, the charging station operator(s) may gradually decrease the real-time operator charging amount. For example, the charging station operator(s) may decrease the amount speculating that the users might be enticed to spend more on additional services or amenities (such as dine-in while charging their vehicles).

In the second mode of system operation, the processor 214 may obtain the real-time operator charging amounts associated with the charging stations 304 located in the local geofence 302 (e.g., from the second user device(s) 206), as described above. In addition, the processor 214 may obtain additional inputs from the first user device 204 and other user devices associated with other vehicles 306a-d. The additional inputs may include one or more user charging amounts (or a charging buying price associated with the energy quantity required) from the first user device 204. Responsive to obtaining the real-time operator charging amounts associated with the charging stations 304 and the additional inputs, the processor 214 may generate a second list of recommended charging stations, and transmit the second list (or cause to display the second list) on the vehicle HMI or the first user device 204.

In some aspects, the second mode of system operation may be implemented in double-cycle, or a first cycle and a second cycle. Each cycle may be divided into a sequence of time slots/periods. For example, each cycle may include a first time period (e.g., a bidding time period), and a second time period (e.g., an implementation time period). In an exemplary aspect, each cycle may be of 20 minutes in which the first time period of each cycle may be from 0 to 10 minutes, and the subsequent second time period may be from 10 to 20 minutes. In some aspects, the second time period of the first cycle may overlap with the first time period of the second cycle.

In the first time period of the first cycle, the processor 214 may obtain a first user charging amount from the first user device 204 (or the vehicle HMI). For example, the processor 214 may obtain a buying price of "5 dollars" at the beginning of the first cycle. Similarly, the processor 214 may obtain buying prices from other vehicle users (associated with the vehicles 306) located in the local geofence 302. The processor 214 may further obtain real-time operator charging amounts (asking prices) from the second user device(s) 206 associated with the charging stations 304 located in the local geofence 302. The processor 214 may sort the buying prices of different vehicle users in a descending order to form a Charging Queue Buy (CQB), and the asking prices from the different charging station operators in an ascending order to form a Charging Queue Sell (CQS) in order pool.

Responsive to forming the CQB and the CQS, and obtaining the first user charging amount and the real-time operator charging amounts, the processor 214, in the first period of the first cycle, may compare the first user charging amount with the real-time operator charging amounts (considering total energy available at the charging stations and required by the vehicle 202), and identify charging station(s) that may be offering the charging amount less than or equal to the first user charging amount. For example, the processor 214 may determine if there exists any charging station in the local geofence 302 that may be offering a charging price at an amount less than or equal to 5 dollars (or the processor 214 may determine a "pair" for the first user charging amount or the vehicle 202). If the processor 214 determines that there exists a charging station that may be offering the charging at an amount less than 5 dollars (i.e., the first user charging amount), the processor 214 may pair the first user charging amount with operator charging amount (or pair the corresponding vehicle and the charging station).

Responsive to identifying the pair, the processor 214 may move to the second period of the first cycle for initiating transaction. In the second period, the processor 214 may be configured to calculate a total amount to be paid by the vehicle user to charge the vehicle 202 at the paired charging station, and the amount the charging station operator (of the paired charging station) may receive. In some aspects, the total amount may include the first user charging amount (e.g., $bid_p$), a charging station assessment amount (an amount corresponding to the historical charging station assessment rating, $P_{ccpa}$), emission related charges or clean energy charges ($P_{ce}$) (an amount associated with clean energy rating as described above), and/or the like. In some aspects, the total amount may be a weighted function of the charging station assessment amount and/or emission related charges. In some aspects, the $P_{ce}$ may be based on low-carbon fuel standard credits for lower-CO2 charging times, fleet credits on off-cycle performance of CO2-focused smart charge; or a utility renewable curtailment credit. A brief description of clean energy charges is provided later in the description below.

For example, the total amount the vehicle user may have to pay is:

$$bid_p + k_1 P_{ccpa} + k_2 P_{ce}$$

where k1 and k2 are weights (which may be zero or non-zero).

In further aspects, the paired charging station operator may receive:

$$ask_s + k3 P_a$$

where asks is the asking price,
k3 is weight (which may be zero or non-zero); and
$P_a$ is a service charge.

It is known that in some markets, a financial price may be tied to environmental consequences (including but not necessarily limited to CO2) through policy mechanisms such as: low-carbon fuel standard credits for lower-CO2 charging times; fleet credits on off-cycle performance of CO2-focused smart charge; or a utility renewable curtailment credit. In the case where such policy mechanism(s) exist and add to the price or benefit to one or more of the CPO, the utility, the customer, or the vehicle OEM with CO2-focused smart charge, the potential consequence/benefit becomes a differentiating factor across EV charging options.

The wide consensus in literature is that marginal emissions forecast, rather than average, is the most effective metric to use. This is because addition of electricity drawn at a given time will contribute to whether a marginal power plant is turned on, but does not affect a base load power plant.

For charging points, distinguishing features such as on-site battery storage and on-site solar may affect when (and how much) electricity will need to be drawn from the grid next because of a candidate charge event at that location. Further, SOC of backup batteries will further have effect. For example, if a candidate Station A and a candidate Station B both have 150 kWh of on-site backup battery storage to buffer, but Station A only has 5 kWh remaining while Station B has 100 kWh remaining, the charge event at Station A would result in a need to draw electricity from the grid. Given the marginal grid emissions at the time of the charge event, the quantification that factors into the CO2 element of the price equation is: how much more or less does charging at Station A (mostly grid electricity) result in relative to drawing down battery storage energy from Station B.

In some aspects, responsive to the determination of the total amount to be paid by the vehicle user, the processor 214 may transmit the information associated with the total amount and the paired charging station to the vehicle 202 (e.g., vehicle HMI) and/or the user device 204. When the vehicle user accepts the offer, the vehicle 202 (and/or vehicle user) may be removed from the order pool. In some aspects, when the processor 214 identifies more than one pairing charging stations, the processor 214 may determine the respective total amount the vehicle user may have to pay in all the scenarios, and may rank the list based on the total amount and list to the vehicle HMI or the user device 204 (and the charging station information and user preferences as described above). The vehicle user may view the list and may select one charging station, and may then initiate transaction as described above.

On the other hand, when the processor 214 may not be able to identify the pair for the first user charging amount in the first time period of the first cycle, the processor 214 may obtain a second user charging amount from the first user device 204 in a first period of the second cycle. The second user charging amount may be greater than the first user charging amount. For example, the second user charging amount may be "6 dollars". The processor 214 may then determine if there exists a pair for the second user charging amount, in the same manner as described above. When the processor 214 identifies the pair for the second user charging amount, the processor 214 may move to the second period of the second cycle (that may be same as the second period of the first cycle). The processor 214 may continue to perform the process until the buying price drops below the selling price or when there are no unmatched users and charging stations. The users and the charging stations may remain in the order pool until the processor 214 identifies respective pairs. New vehicle users may be added in the order pool when the processor 214 receives more requests to charge their respective vehicles in the same local geofence.

Figure 4:
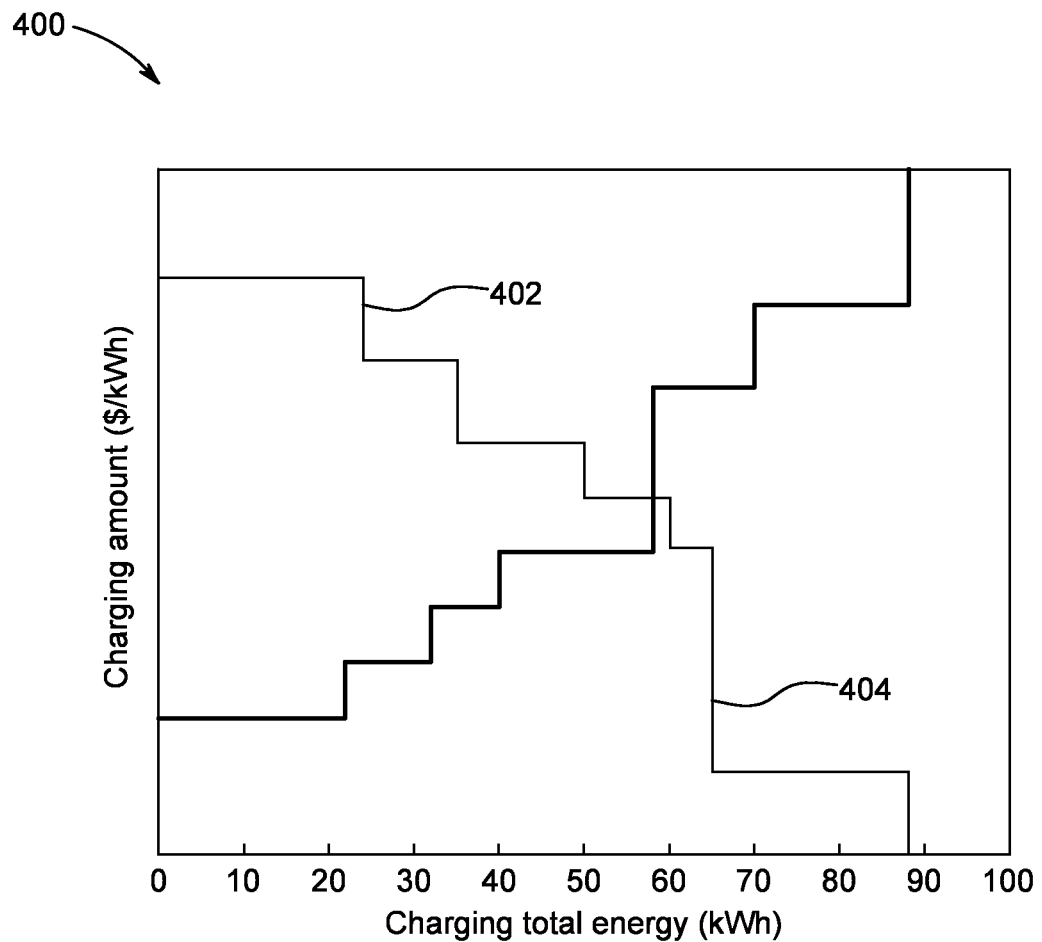
FIG. 4 depicts an example graph of demand and supply of EV charging stations and vehicles in accordance with the present disclosure.

FIG. 4 depicts an example graph 400 of demand and supply of EV charging stations and vehicles in accordance with the present disclosure. Specifically, the graph 400 represents the charging amount per unit energy in the Y axis and a total amount of charging energy in the X axis. The graph 400 represents a typical supply and demand curve of the vehicle users (as depicted by a graph line 402) and charging station operators (as depicted by a graph line 404) participating in the second mode (bidding process). As apparent from the graph 400, the per unit energy price/fees decreases for a vehicle/vehicle user as the vehicle charges more amount of energy; and the per unit energy price/fees increases for the charging station as more energy is expended.

Figure 5:
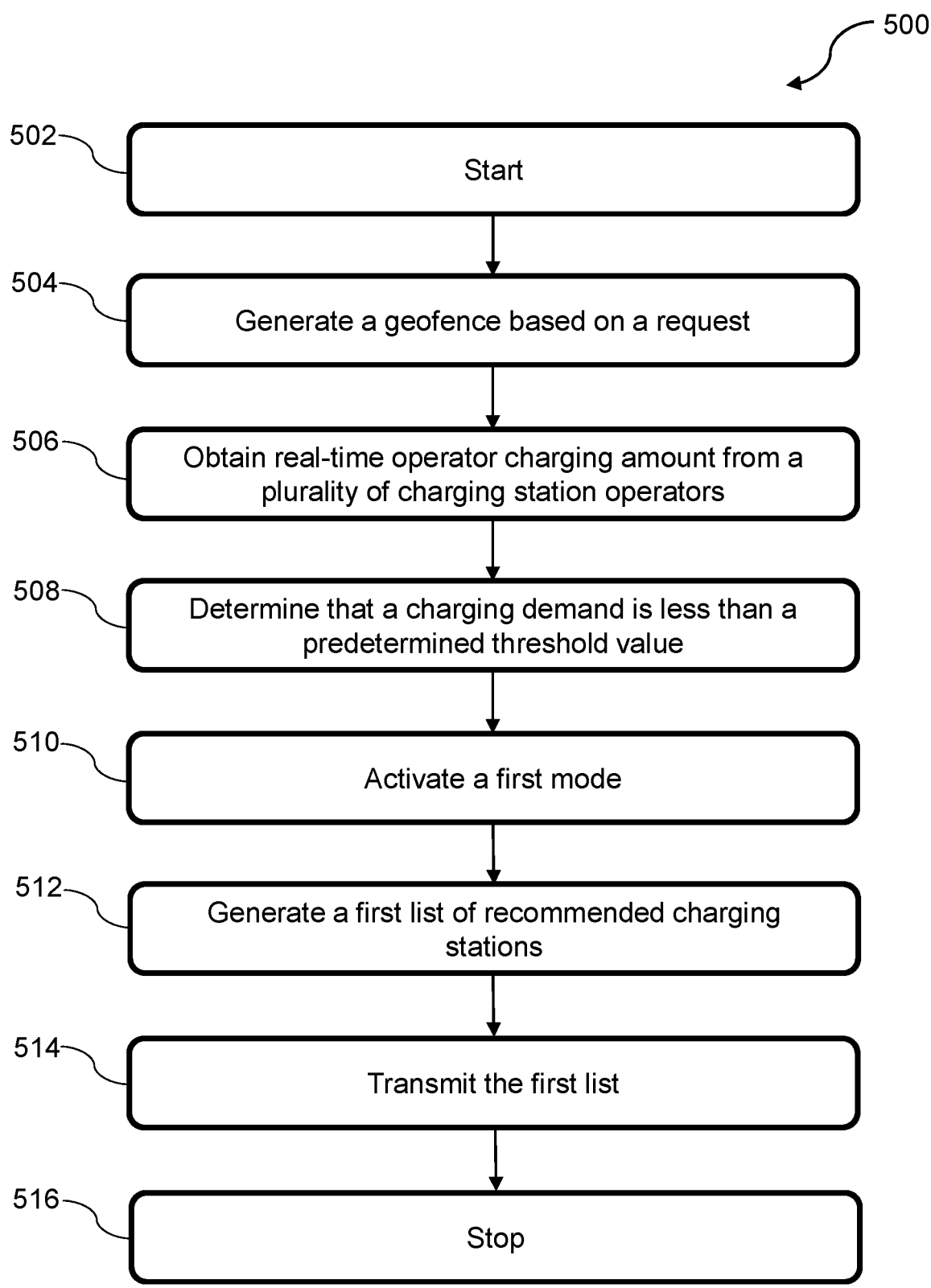
FIG. 5 depicts a flow diagram of an example EV charging recommendation method in accordance with the present disclosure.

FIG. 5 depicts a flow diagram of an example EV charging recommendation method 500 in accordance with the present disclosure. FIG. 5 may be described with continued reference to prior figures, including FIGS. 1-4. The following process is exemplary and not confined to the steps described hereafter. Moreover, alternative embodiments may include more or less steps that are shown or described herein and may include these steps in a different order than the order described in the following example embodiments.

The method 500 starts at step 502. At step 504, the method 500 may include generating, by the processor 214, a geofence (e.g., the local geofence 302) based on a request to provide a recommendation of a charging station to charge a vehicle associated with a vehicle user. In some aspects, the processor 214 may obtain the request from the first user device 204. The request may include one or more of vehicle route information and vehicle State of Charge (SoC) level. At step 506, the method 500 may include obtaining, by the processor 214, the real-time operator charging amounts from the second user device 206 associated with a plurality of charging station operators of charging stations located in the local geofence 302. As described above, the local geofence 302 may be generated based on the vehicle route information and/or the current SOC level.

At step 508, the method 500 may include determining, by the processor 214, that a charging demand in the local geofence 302 is less than a predetermined threshold value. At step 510, the method 500 may include activating, by the processor 214, the first system operational mode responsive to a determination that the charging demand is less than the predetermined threshold value. Responsive to a determination that the charging demand is greater than the predetermined threshold value, the processor 214 may activate the second system operational mode.

At step 512, the method 500 may include generating, by the processor 214, a first list of recommended charging stations from a plurality of charging stations based on the real-time operator charging amounts. At step 514, the method 500 may include transmitting, by the processor 214, the first list of recommended charging stations to the first user device 204 or the vehicle HMI.

The method 500 may end at step 516.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
  a transceiver configured to receive a request from a user interface associated with a vehicle user, wherein the request comprises one or more of vehicle route information and a vehicle State of Charge (SoC) level;
  a processor communicatively coupled to the transceiver, wherein the processor is configured to:
   generate a geofence based on the request;
   obtain real-time operator charging amounts from one or more charging station operators located in the geofence;
   activate a first system operational mode responsive to a determination that a charging demand is less than a predetermined threshold value;
   generate a first list of recommended charging stations from of the one or more charging stations based on the real-time operator charging amounts;
   transmit the first list of recommended charging stations to the user interface;
   activate a second system operational mode responsive to a determination that the charging demand in the geofence is greater than the predetermined threshold value;
   obtain a first user charging amount from the user interface;
   compare the first user charging amount with the real-time operator charging amounts;
   identify one or more first charging stations from the one or more charging stations that are offering charging at a charging amount less than the first user charging amount based on the comparison;
   generate a second list of recommended charging stations comprising the one or more first charging stations; and
   transmit the second list of recommended charging stations to the user interface.

2. The system of claim 1, wherein the processor is further configured to generate the first list of recommended charging stations based on user preferences and information associated with historical assessment of the plurality of charging stations.

3. The system of claim 2, wherein the user preferences comprise one or more of: a preferred charging speed, a charging station reliability, and a charging station location.

4. The system of claim 1, wherein the processor is further configured to obtain a selection of a charging station from the first list of recommended charging stations from the user interface.

5. The system of claim 4, wherein the processor is further configured to enable a transaction between the user interface and the charging station.

6. The system of claim 1, wherein the processor is further configured to:
  obtain a second user charging amount from the user interface when the processor does not identify a charging station that is offering charging at a charging amount less than the first user charging amount based on the comparison.

7. The system of claim 6, wherein the processor is further configured to:
  compare the second user charging amount with the real-time operator charging amounts;
  identify one or more second charging stations from the one or more charging stations that are offering charging at a charging amount less than the second user charging amount based on the comparison;

generate a third list of recommended charging stations comprising the one or more second charging stations; and transmit the third list of recommended charging stations to the user interface.

8. A method to provide a recommendation of a charging station, the method comprising:

obtaining, by a processor, a request from a user interface associated with a vehicle user, wherein the request comprises one or more of vehicle route information and a vehicle State of Charge (SoC) level;

generating, by the processor, a geofence based on the request;

obtaining, by the processor, real-time operator charging amounts from one or more charging station operators located in the geofence;

activating, by the processor, a first system operational mode responsive to a determination that a charging demand is less than a predetermined threshold value;

generating, by the processor, a first list of recommended charging stations from a plurality of charging stations based on the real-time operator charging amounts;

transmitting, by the processor, the first list of recommended charging stations to the user interface;

activating a second system operational mode responsive to a determination that the charging demand is greater than the predetermined threshold value;

obtaining a first user charging amount from the user interface in the second system operational mode;

comparing the first user charging amount with the real-time operator charging amounts;

identifying one or more first charging stations from the plurality of charging stations that are offering charging at a charging amount less than the first user charging amount based on the comparison;

generating a second list of recommended charging stations comprising the one or more first charging stations; and transmitting the second list of recommended charging stations to the user interface.

9. The method of claim 8, wherein generating the first list of recommended charging stations is based on user preferences and information associated with historical assessment of the plurality of charging stations.

10. The method of claim 9, wherein the user preferences comprise one or more of: a preferred charging speed, a charging station reliability, and a charging station location.

11. The method of claim 8 further comprising obtaining a selection of a charging station from the first list of recommended charging stations from the user interface.

12. The method of claim 11 further comprising enabling a transaction between the user interface and the charging station.

13. The method of claim 8 further comprising obtaining a second user charging amount from the user interface when no charging station that is offering charging at a charging amount less than the first user charging amount is identified.

14. The method of claim 13 further comprising:

comparing the second user charging amount with the real-time operator charging amounts;

identifying one or more second charging stations from the plurality of charging stations that are offering charging at a charging amount less than the second user charging amount based on the comparison;

generating a third list of recommended charging stations comprising the one or more second charging stations; and transmitting the third list of recommended charging stations to the user interface.

* * * * *